June 3, 1952  P. KVEDERIS  2,599,262
FOUNDRY MOLDING MACHINE
Filed Dec. 30, 1948  11 Sheets-Sheet 8

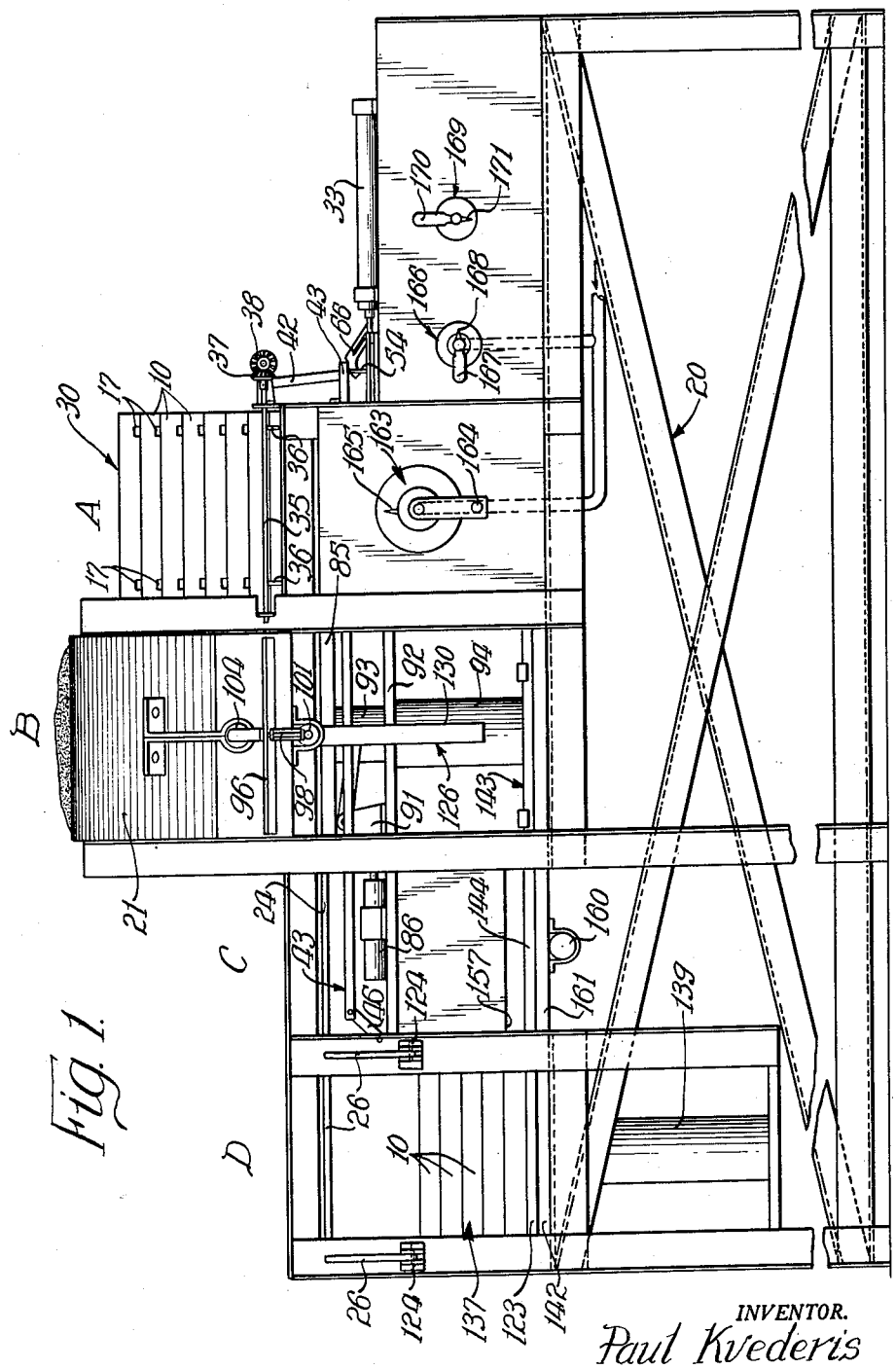

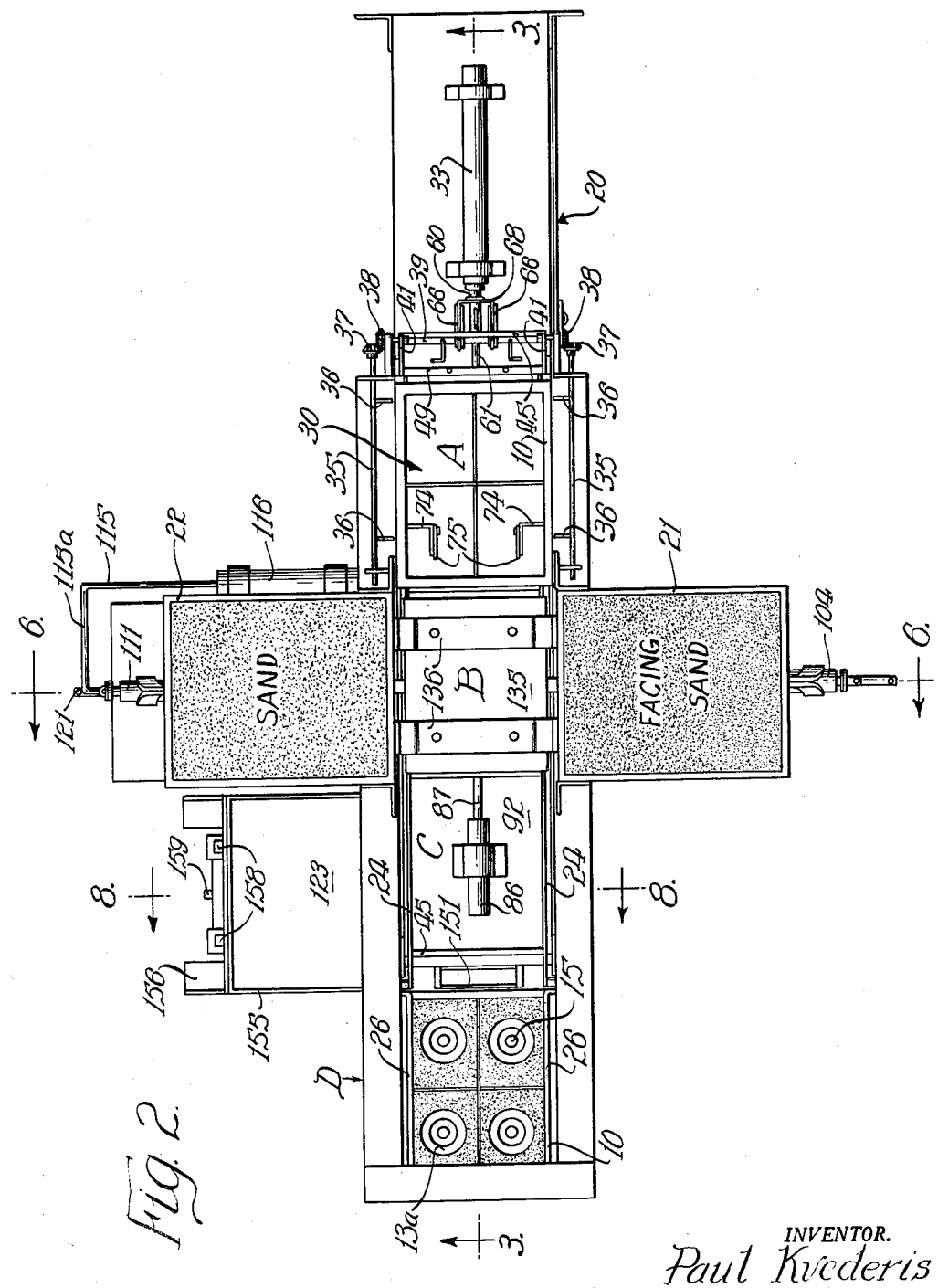

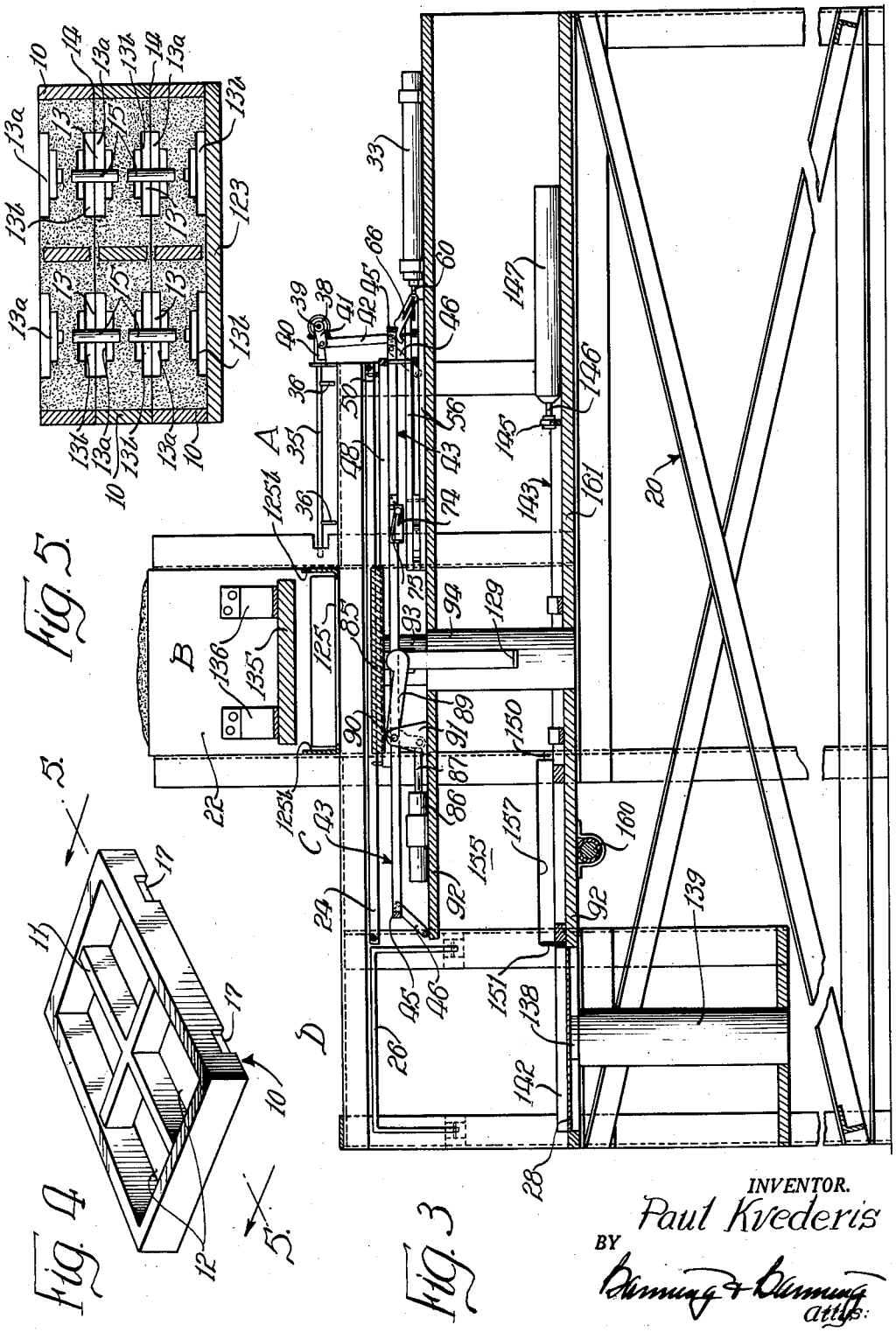

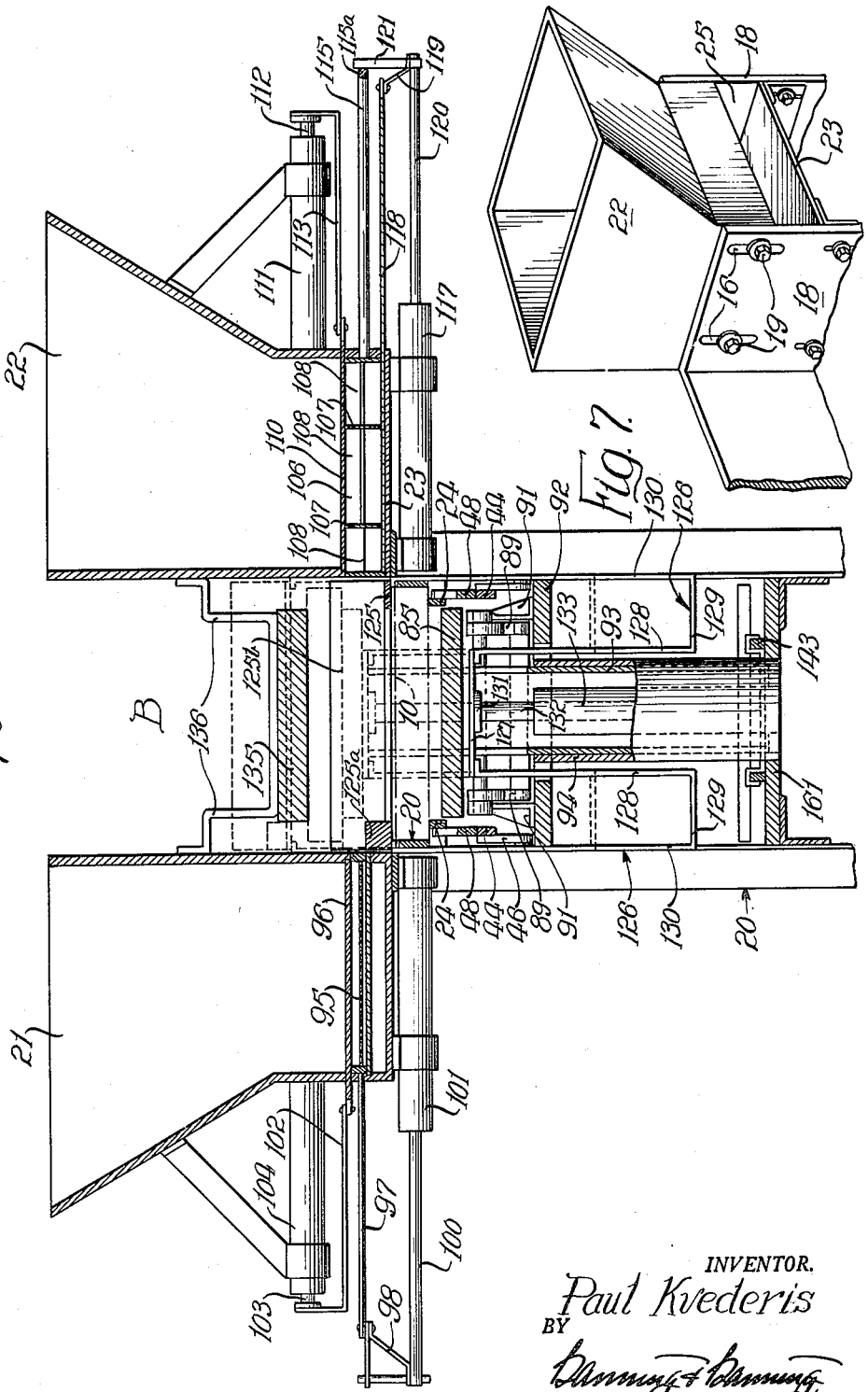

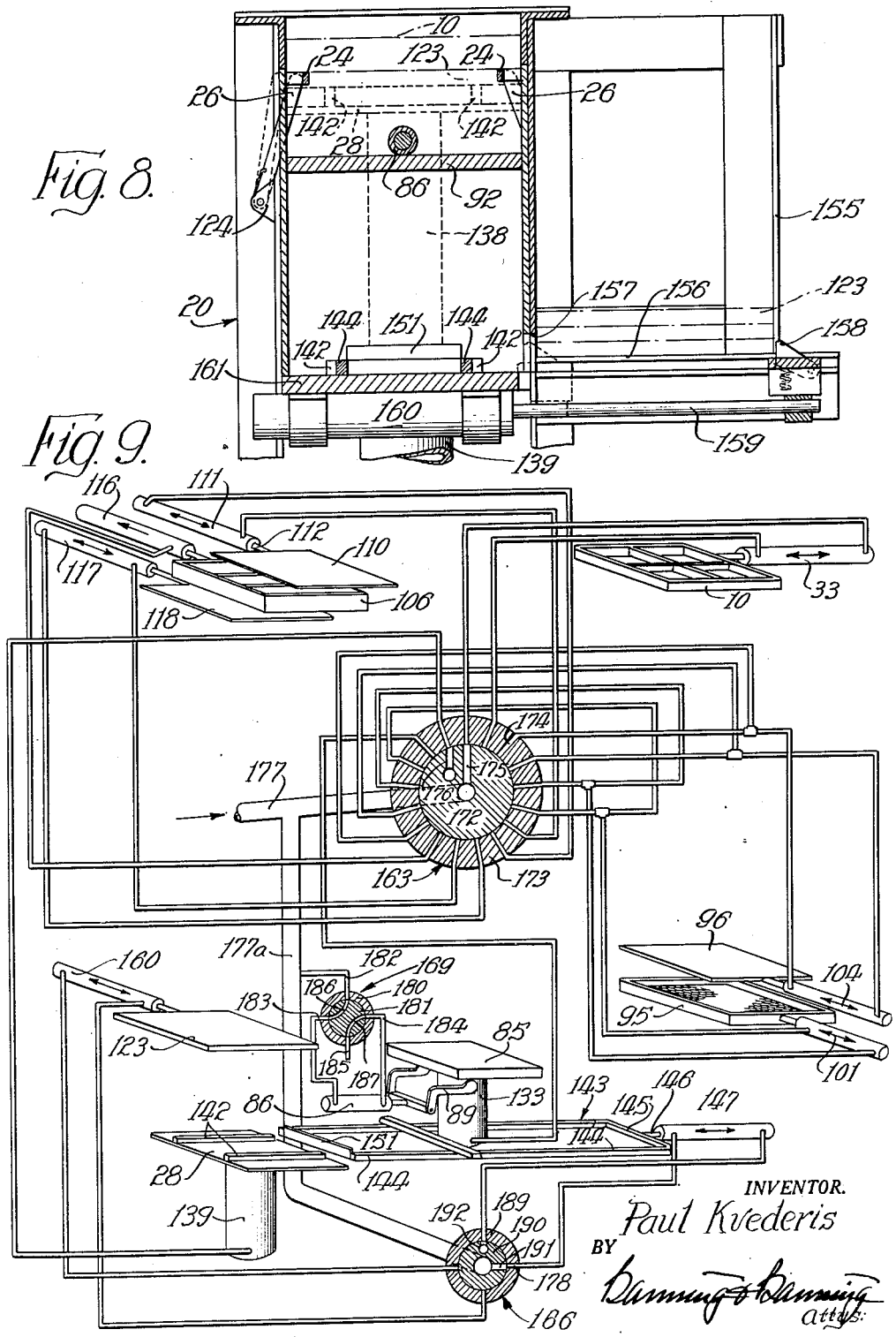

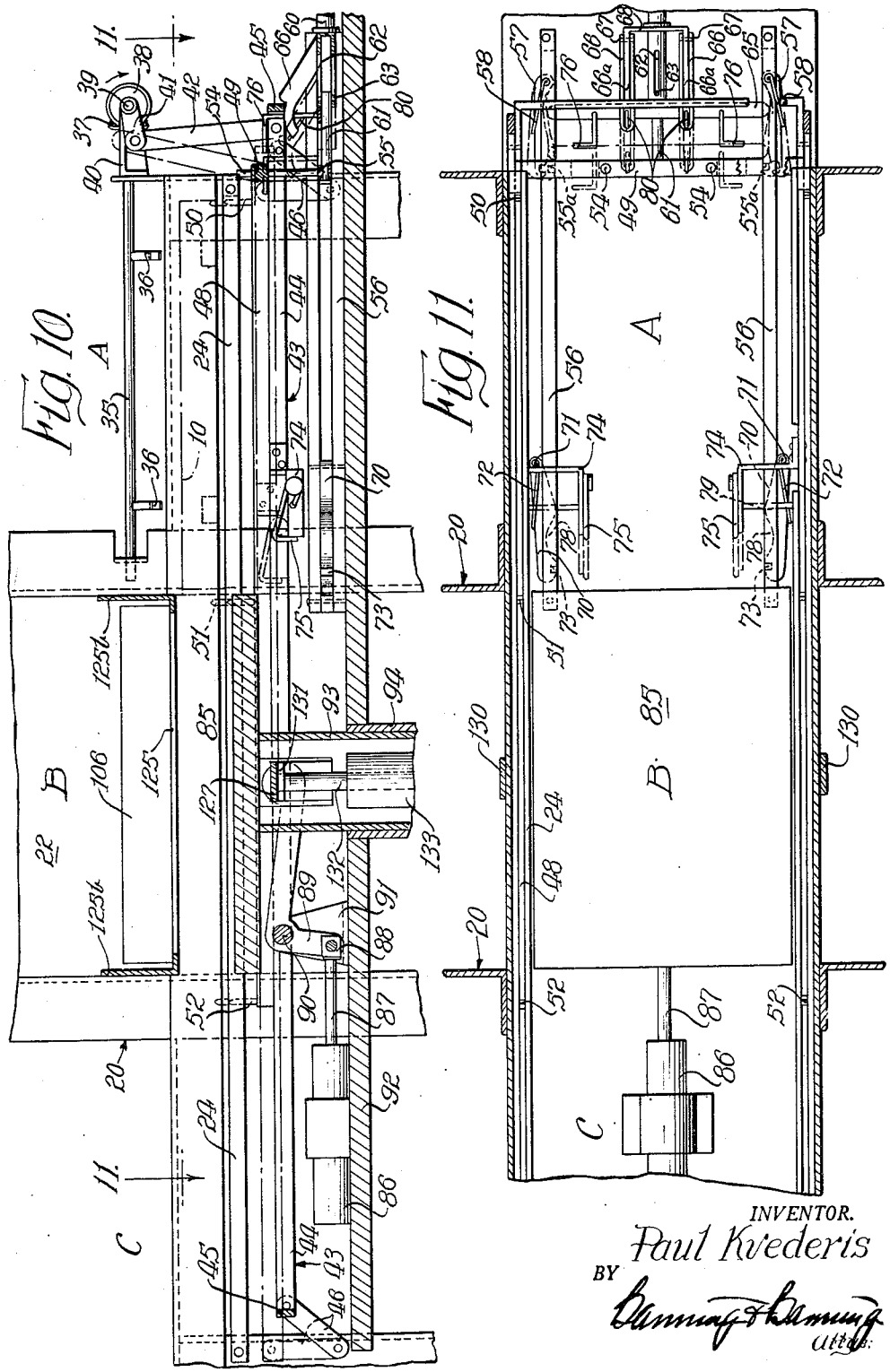

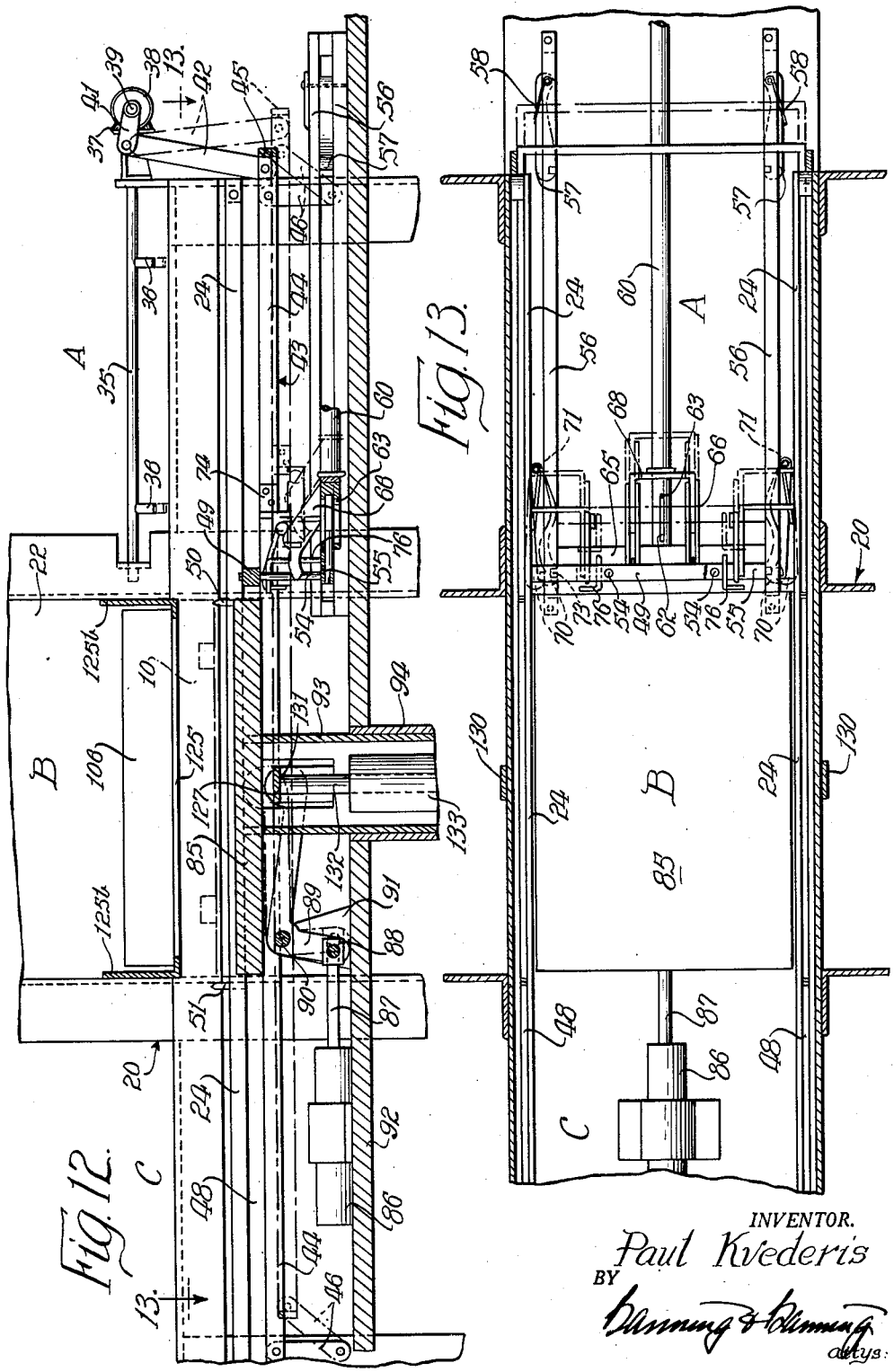

INVENTOR.
Paul Kvederis
BY

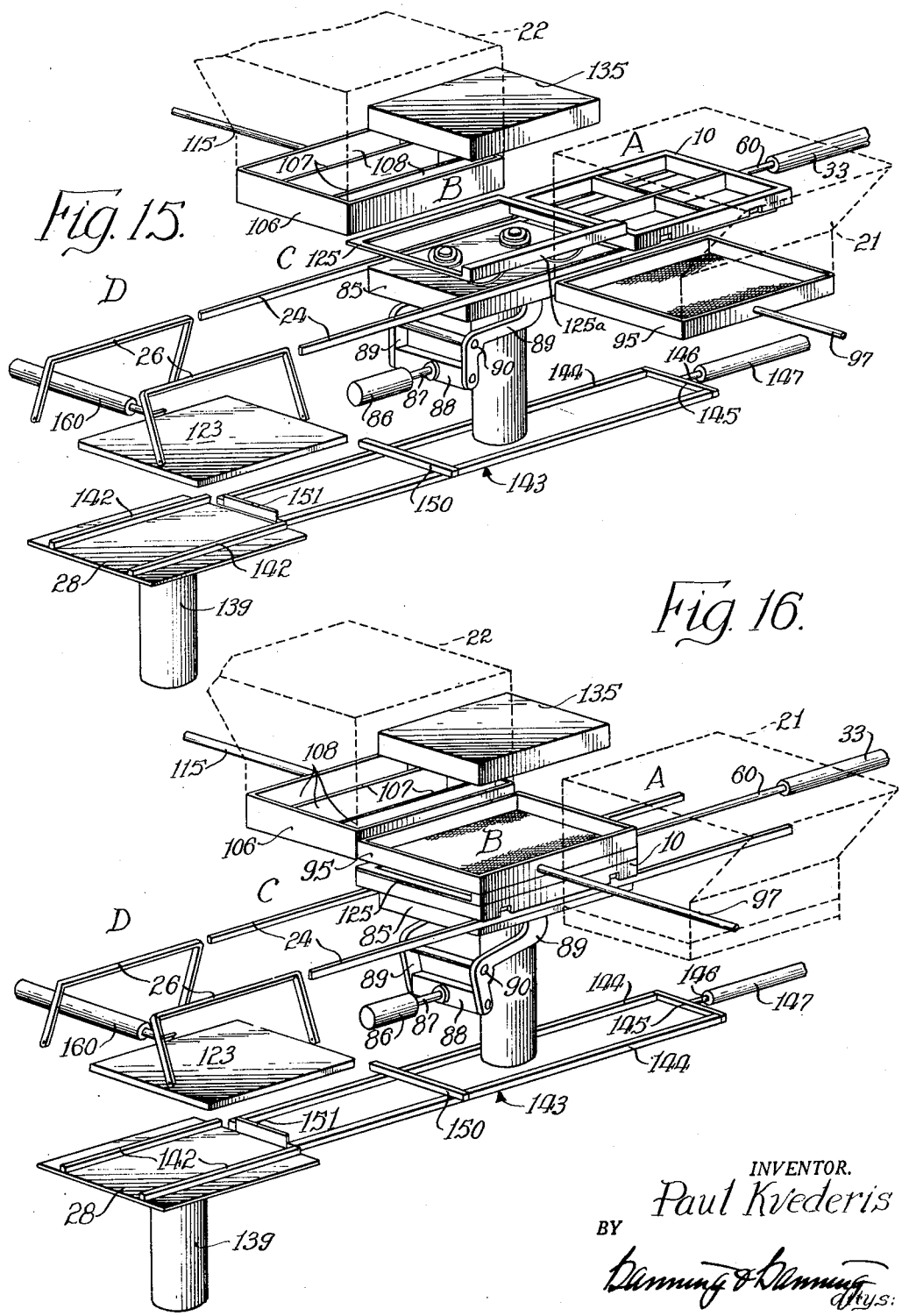

June 3, 1952 P. KVEDERIS 2,599,262
FOUNDRY MOLDING MACHINE
Filed Dec. 30, 1948 11 Sheets-Sheet 10
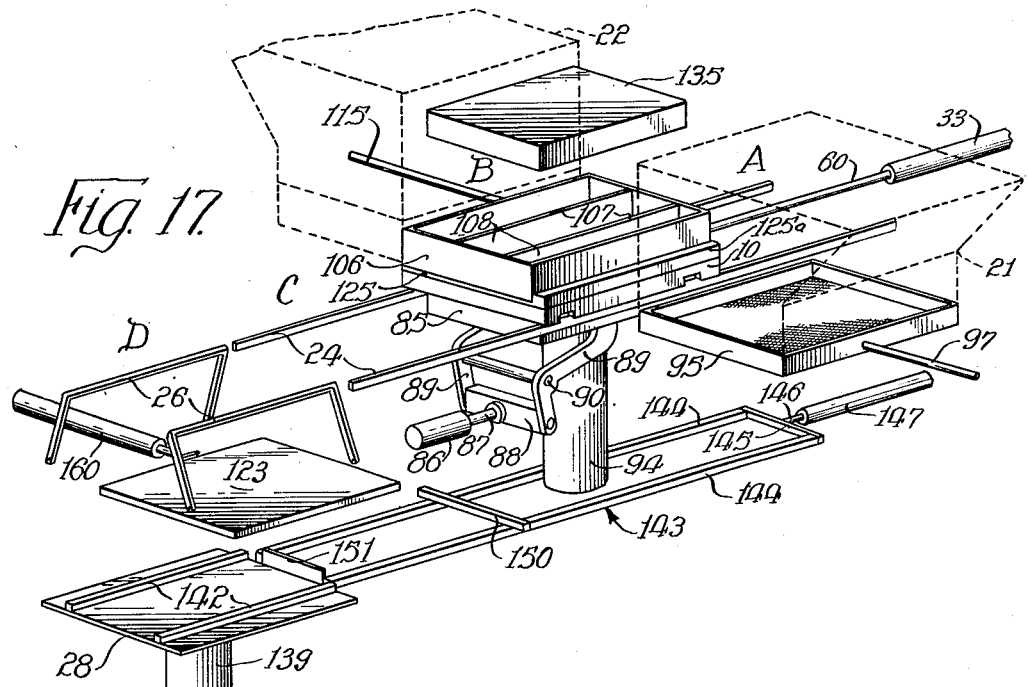
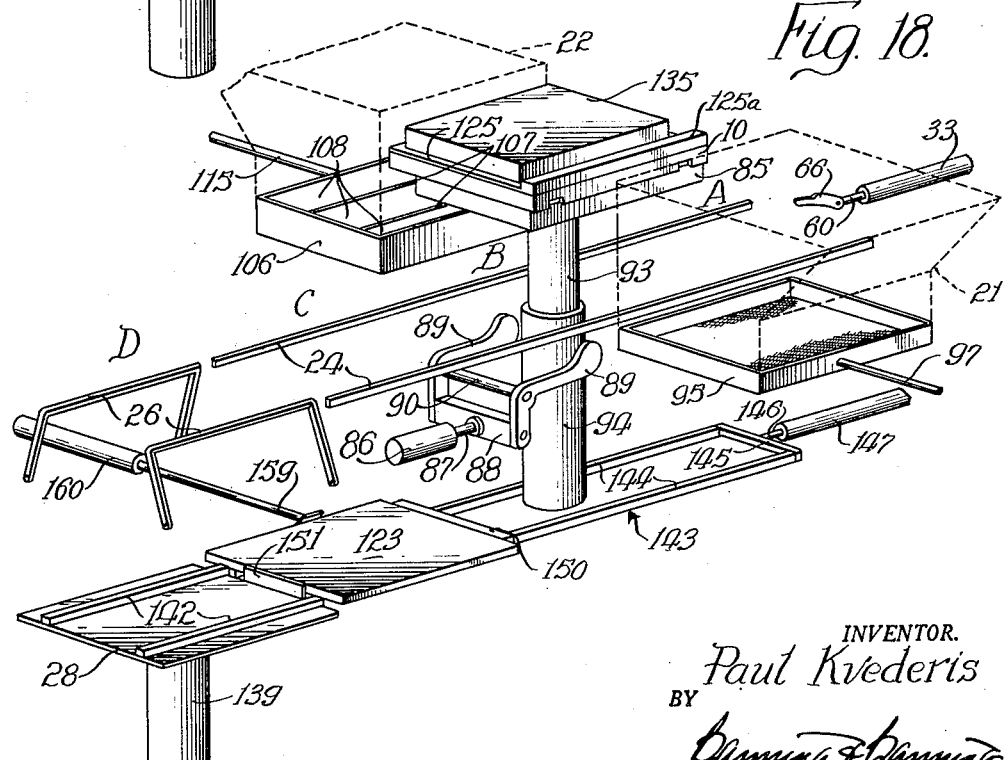
INVENTOR.
Paul Kvederis June 3, 1952 P. KVEDERIS 2,599,262
FOUNDRY MOLDING MACHINE
Filed Dec. 30, 1948 11 Sheets-Sheet 11
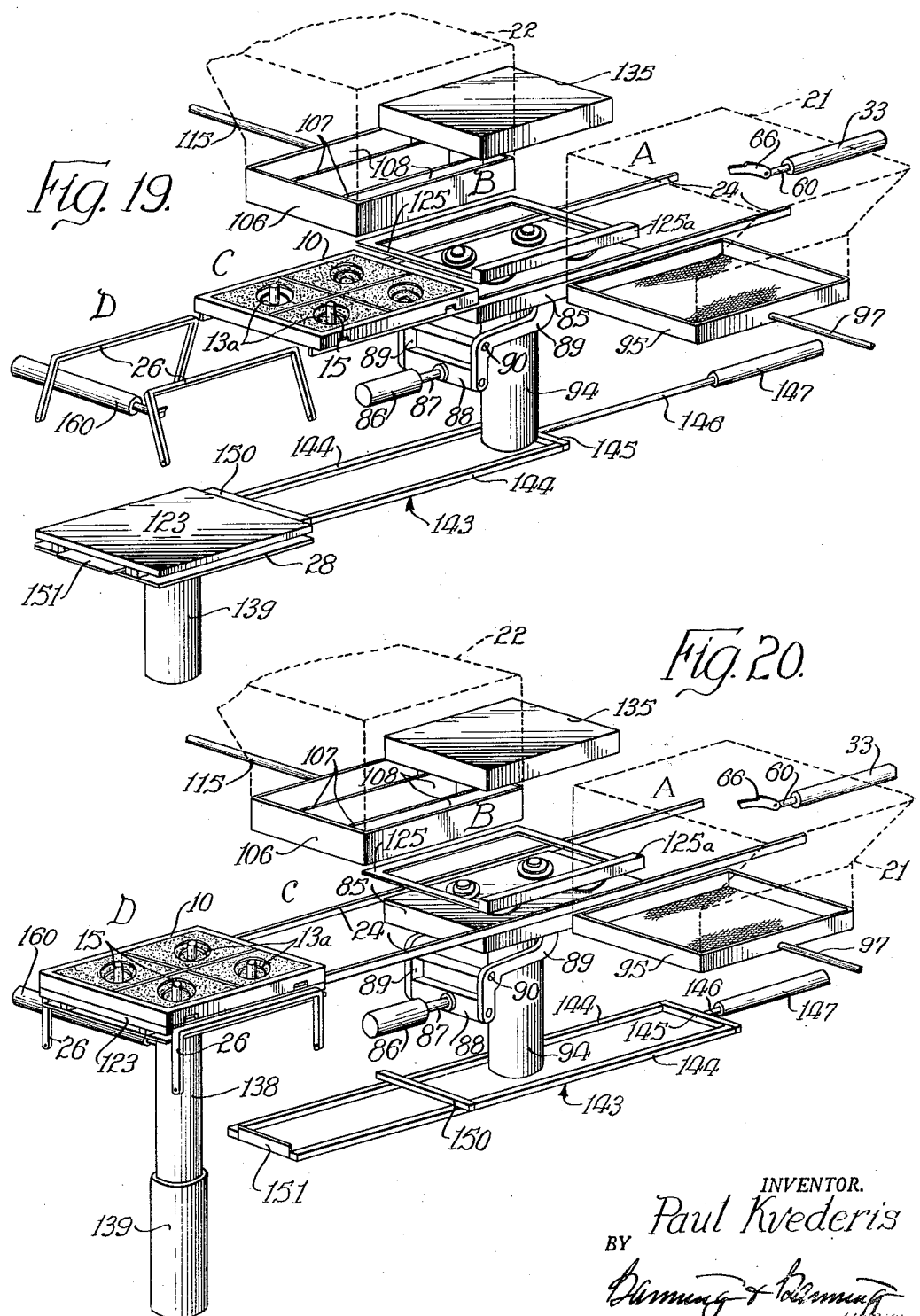
INVENTOR.
Paul Kvederis
BY Patented June 3, 1952

2,599,262

UNITED STATES PATENT OFFICE 2,599,262

FOUNDRY MOLDING MACHINE

Paul Kvederis, Chicago, Ill.

Application December 30, 1948, Serial No. 68,219

13 Claims. (Cl. 22—20)

1

This invention relates to the art of making metal castings in sand molds, and has to do more particularly with a new sand molding process and a machine for carrying out the new process in a speedy and efficient manner.

The primary object of my invention is to effect substantial savings through reduced molding costs, when relatively large numbers of identical castings are to be made.

Another object is to provide a molding machine capable of efficiently producing sand molds in large numbers at a rapid rate, and especially a machine of that character which can be built at a cost which renders its use economically advantageous.

Additional objects of a subordinate character, together with the novel features characterizing my invention, will be pointed out in conjunction with the ensuing detailed description.

In the drawings which accompany this specification:

Figure 1 is a side elevation of a molding machine constructed in accordance with the subject invention and representing a preferred embodiment thereof;

Fig. 2 is a plan view of the machine;

Fig. 3 is a vertical section, taken at line 3—3 of Fig. 2;

Fig. 4 is a perspective view of one of the mold flasks;

Fig. 5 is a sectional view, taken at line 5—5 of Fig. 4, showing three stacked mold flasks with sand fillings and mold cavities;

Fig. 6 is a sectional view, taken at line 6—6 of Fig. 2;

Fig. 7 is a perspective view showing a detail of construction;

Fig. 8 is a sectional view taken at line 8—8 of Fig. 2;

Fig. 9 is a diagrammatic showing, in perspective, of the several fluid-pressure cylinders and their respectively associated driven members, together with the fluid-pressure control valves and interconnecting conduits;

Fig. 10 is an enlarged reproduction of a portion of Fig. 3;

Fig. 11 is a sectional plan view taken at line 11—11 of Fig. 10;

Fig. 12 is identical with Fig. 10, except that it shows certain parts of the mechanism in alternate positions;

Fig. 13 is a sectional plan view like Fig. 11 but corresponding to Fig. 12 as respects the positioning of various mechanical elements;

Figure 14:
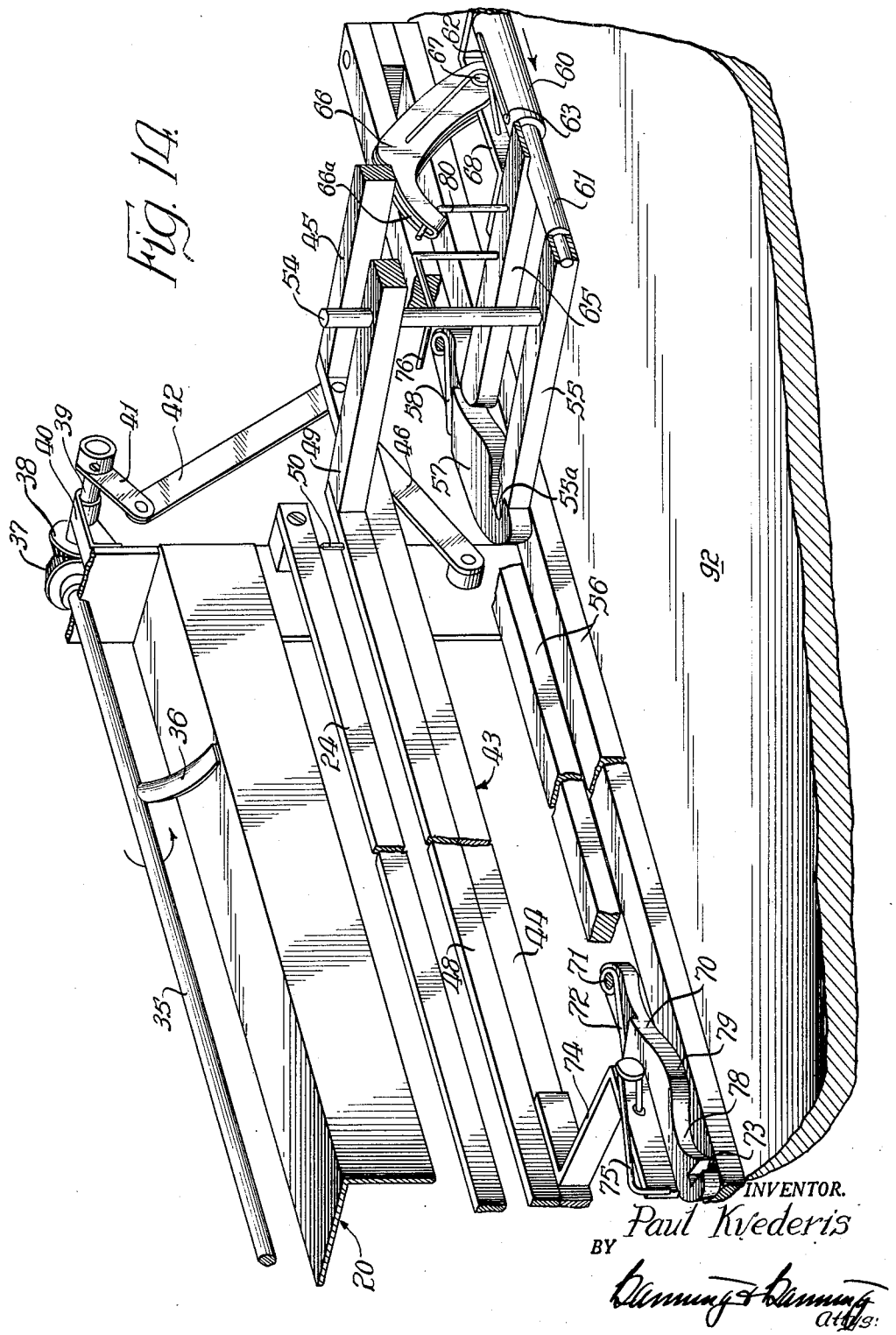

Fig. 14 is a perspective view of a part of the flask-pusher mechanism, and illustrates certain features which otherwise would be obscure; and Figs. 15–20 inclusive are a series of perspective schematic views illustrating, sequentially, the steps comprising a single cycle of operation of the molding machine, the supporting structure and mechanical elements not essential to an adequate explanation of the mode of operation of the machine having been omitted in pursuance of greater clarity. These six views are intended only to illustrate the essential principles of the machine and do not in all respects accord precisely with the actual mechanism shown in the other views; moreover, some of the mechanism which is not essential to a comprehension of the principles of the invention has been omitted from these views in furtherance of simplification.

The general aspects of the subject molding machine can satisfactorily be explained by reference exclusively to Figs. 1–3 and 6; but for particularity it will be necessary, subsequently, to refer to the other figures.

First, it should be made clear that the mold cavities into which the molten metal is to be poured and formed in molding sand, such as that commonly used in foundries; and usually the patterns which form the mold cavities are made each in two complementary halves, each capable of being withdrawn from the compacted sand without damage to the mold. And so-called flasks are necessarily employed to receive and hold the molding sand, as is likewise the case in conventional foundry practice.

A typical flask suitable for use with the subject machine is shown in Fig. 4 and identified, as a whole, by the reference numeral 10. This, as will be seen, is a rectangular receptacle in the form of a box or frame, with open top and bottom; and it may be divided by partitions 11 into a number of compartments. Four such compartments 12 are shown in this instance. Whether or not the flasks are, in fact, partitioned to form compartments and, if so, the number of compartments, is determined largely by the size of the parts to be cast. Preferably, the flasks are made of metal, for example aluminum. The compartments 12 are designed to be filled with molding sand, which is firmly compacted therein. In Fig. 5 there is shown in transverse section a partial stack comprising three flasks 10 the compartments 12 of which have been filled with molding sand in which the mold cavities have been formed. Each of the four complete mold cavities shown in Fig. 5 is identified as a whole by the reference numeral 13; and each said cavity 13 is formed by the juxtaposition of a lower semi-cavity 13a and an upper semi-cavity 13b situated, respectively, below and above a parting surface 14.

It will be apparent to those skilled in foundry practice that the upper flask 10 of Fig. 5 corresponds to the usual cope, while the bottommost flask of the same figure corresponds to the usual drag; and it will further be apparent that the middle flask functions as both cope and drag. It is a cope with reference to the flask immediately below and a drag with reference to the flask immediately above. For purposes of illustration I have shown in Fig. 5 a partial stack comprising only three flasks, but in practice a complete stack may comprise eight or more flasks; in such a case at least six flasks serve as both cope and drag, while the uppermost flask is effective only as a cope while the lowermost one is effective only as a drag.

When cores are required the patterns are provided with the usual core prints and the cores themselves are put in place manually before the flasks are stacked by the machine. In Fig. 5 I have illustrated a case which requires the inclusion of a core 15 in each mold cavity. The gates may be formed, in part, by suitable projections on the patterns and, in part, manually, by suitable gate-cutting tools.

Insofar as I have been able to ascertain, it has never before been proposed in foundry practice to make up multiple mold units in the form of stacks comprising numerous flasks, wherein the several flasks, exclusive of the top and bottom ones, each serve as both cope and drag; and inasmuch as this apparently novel procedure can be availed of advantageously, even when performed manually, I am claiming the involved process or method irrespective of whether it is carried out by the subject machine or manually, or with the aid of some other machine.

The manual procedure consists in placing a flask on a pattern board having one or more half-patterns thereon in upwardly projecting relief, sprinkling the pattern, when necessary, with facing sand or the like, filling the mold compartments with sufficient molding sand to fully occupy the flask when the sand is compacted, and then impressing the other half-pattern or patterns into the upper surface, after applying to the upper surface a thin coating of facing sand, if that be considered necessary or desirable. Several thus-completed mold units, each comprising one flask with its sand content and semi-cavities, are then stacked to any convenient height, it being understood that essential gates are to be provided so that the molten metal can be admitted at the top of the stack.

Each flask 10 is provided with two notches 17 on each of two opposite sides, along the lower edges thereof. The purpose of these notches is to accommodate certain mechanical lifting fingers forming parts of the molding machine, as will later be fully explained.

Referring primarily to Figs. 1-3 and 6, the subject molding machine includes a structural framework 20 fabricated mainly of angle irons and plates arranged to provide suitable supports for all the various working parts and to maintain the same in their intended spacial relation. And said framework may be bolted to any suitable foundation or left unanchored, as may be preferred.

Supported on the framework 20 are two hoppers or bins 21 and 22 intended to receive and hold supplies of facing sand and molding sand, respectively. Said hoppers should either be large enough to hold sufficient sand to keep the machine in operation for a considerable period or conveyor means should be provided to replenish the supply, especially of the molding sand. But inasmuch as the volume of facing sand ordinarily required is small compared to the requirement for molding sand, it usually is practicable to refill the hopper 21 manually.

As shown most clearly in Figs. 2 and 6, the two hoppers 21 and 22 are positioned at either side of the supporting framework 20; and within the space therebetween, but at a somewhat lower level, there is a horizontal main track comprising two laterally spaced parallel rails 24, 24. These rails are affixed to and carried by the supporting framework, and they serve, in turn, as supports along which the flasks 10 are advanced, in succession, first to a position B between the two hoppers, where they are filled, one at a time, and where the patterns are pressed into the sand fillings to form the semi-cavities 13a and 13b and, secondly, out of position B into position C and thence onto an auxiliary track at position D, this auxiliary track comprising a pair of auxiliary rails 26, 26 located at the discharge end of the main track 24, 24 and normally aligned therewith. The auxiliary track is designed to receive the flasks, one at a time; and immediately after being deposited thereon, the flasks are transferred downwardly, one at a time, by an elevator which, upon rising, spreads the auxiliary rails 26, 26 apart, thereby causing the flask resting on the auxiliary track to be deposited on the elevator platform designated as 28.

The unfilled flasks 10, each of which may be identical with that shown in Fig. 4, are stacked on the main track 24, 24 at position A, as best illustrated in Figs. 1 and 2, where the stack, as a whole, is designated by the reference numeral 30. Each individual flask is taken, in turn, from the bottom of the stack 30 and moved along the main track to the filling station, position B, whereafter it is moved by the flask-pusher mechanism to position C on the main track, from which latter position it is next moved to position D on the auxiliary track 26, 26.

The first step in each cycle of operation consists in transferring a flask from the bottom of the stack 30 at position A, to the filling station at position B, which is to say, between the two hoppers 21 and 22. This is illustrated schematically, but without a showing of mechanical details, in Figs. 15 and 16, in the former of which a flask 10 is shown in its initial position on the main track. In Fig. 16 the same flask is shown advanced to position B, having been pushed along the main track by fluid-pressure actuated means including a pressure cylinder 33. Parenthetically, it may be noted that Figs. 15–20 are purely schematic and differ somewhat in mechanical detail from the other figures in order to simplify the showing; also, various details have been omitted from these figures for the same reason.

The flask-pusher mechanism

The mechanism which operates to push the flasks along the main track preferably is motivated by compressed air or hydraulic pressure and, as is shown in detail in Figs. 10–14, includes that portion of the main track on which the stack 30 rests; and there is shown in Fig. 14 a portion of a rail 24 which is one of the two parallel rails constituting the main track. The stack of flasks 30 has been omitted from the showing of this figure in order not to obscure mechanical parts which the view is intended to exhibit.

To facilitate moving the flasks, one at a time, from the bottom of the stack 30, means are provided for lifting the stack, with the exception of the bottom flask, and for holding it in elevated position throughout each forward stroke of the flask-pusher mechanism. Said means comprises two shafts 35, 35 located at either side of the stack and extending parallel to the main track. These shafts are equipped each with two laterally projecting crescent-like fingers 36 the distal ends of which are positioned to enter the notches 17 formed in the sides of the flasks, as most clearly shown in Fig. 4. Normally, the fingers 36 are clear of the flasks, but when the shafts 35 are rotated, as indicated by an arrow in Fig. 14, they enter the notches 17 of the flask immediately above the bottom one, and then, upon further rotation of these shafts in the same direction, proceed to lift the entire stack, except the bottom flask thereof. Each of the two shafts 35 is provided with a bevel gear 37 which is meshed with a companion bevel gear 38 secured to a cross-shaft 39 journaled in brackets 40. Two lever arms 41 secured to the cross-shafts 39 are pivotally connected at their distal ends to the upper ends of a pair of links 42 the lower ends of which are pivotally connected to a member 43, referred to herein as an elevator. The latter is a rectangular frame comprising two elongate side members 44, 44 (see Figs. 6, 10, 12 and 14) and two cross members at either end which serve to tie together the side members 44. Each of these side members is pivotally connected near its two ends, respectively, to identical links 46, 46; which are, in turn, pivotally connected to the frame of the machine. By reason of being mounted on the four links 46, the elevator 43 is adapted to be moved bodily along parallel arcuate paths, each having a radius equal to the distance between the pivotal centers of each link. At the outset of each cycle the elevator 43 is in a depressed position from which it moves upwardly and horizontally along its arcuate paths. The vertical component alone performs a useful purpose, the horizontal component being wholly incidental and a result of the most expedient way of propelling the elevator.

Superimposed upon the elevator side members 44, 44 are two parallel slide bars 48, 48. These are tied together at their rear ends by a crossbar 49 and, as viewed in Fig. 6, are offset laterally from the respectively associated main track rails 24. Each of said slide bars 48 carries three upwardly projecting lugs 50, 51 and 52, and when the slide bars are lifted by the elevator 43 the aforementioned lugs are caused to extend above the top surfaces of the rails 24, and each is thereby positioned at the rear of a flask on the main track, assuming, of course, that there are three flasks on the main track which ordinarily is the case. And when the slide bars and their lugs have thus been lifted they are movable lengthwise of the main track to propel the flasks therealong. The lugs 50 engage the flask at position A which is at the bottom of the stack 30; the lugs 51 engage the immediately preceding flask, which is at position B; and the lugs 52 engage the second preceding flask which is at position C. Obviously, all the flasks could be moved by the single pair of lugs 50, by causing the rearmost flask to abut the next in line, etc.; however, it is desirable to have the flasks spaced apart on the track, and to accomplish that end the additional lugs are provided.

It is further desirable that the lugs 50, 51 and 52 rise vertically to engage the flasks, instead of following an arcuate path corresponding to that of the elevator 43; and in order to cause them to so move it is necessary to restrain the slide bars 48 against horizontal movement until they have first been elevated to such an extent that the lugs are in position to propel the flasks. This is accomplished by means of two vertical guide pins 54 which are slidably fitted in openings in the crossbar 49 and anchored at their lower ends to a crosshead 55 the ends of which are slidably mounted on two bars 56 forming parts of the machine frame. The crosshead 55 has ears 55a at its two ends which are adapted to be engaged by latch hooks 57 located at either end thereof and pivotally connected to the bars 56. The two latch hooks 57 are biased toward latching position by springs 58, and at the outset of each cycle of the flask-pusher mechanism they are engaged with the crosshead 55 so that the latter is positively restrained against forward movement. It will be clear that if the elevator is actuated while the crosshead 55 remains anchored, the slide bars 48 will rise with the elevator but cannot move lengthwise because of their attachment to the crosshead through the guide pins 54.

A piston rod 60 having a piston (not shown) operates within the bore of the cylinder 33 wherein it is reciprocable in response to compressed air or other fluid pressure admitted thereto; and this piston rod is bored axially at its outer end to receive a plunger rod 61, and is provided with a lengthwise slot 62 (Fig. 14) into which extends a pin 63 attached to the plunger rod. This plunger rod 61 is reciprocable lengthwise relatively to the piston rod 60 to a limited extent, as determined by the length of the slot 62 which limits the travel of the pin 63. When the piston rod 60 is in retracted position (see Fig. 14) it can be moved forwardly to the extent permitted by the slot 62 and pin 63 without actuating the plunger rod 61; but thereafter the plunger rod and crosshead 55 move forwardly with the piston rod 61 and carry with them the crossbar 49 and slide bar 48, thereby advancing the flasks along the main track. But before these several parts can be moved, it is necessary to retract the latch hooks 57 to release the crosshead 55 therefrom; and that is accomplished by means of another crossbar 65 which is driven forwardly by the piston rod 60 toward the crosshead 55 during the initial portion of each forward stroke of said piston rod. The two ends of the crossbar 65 are rounded, as shown, and are adapted to engage the latch hooks 57 and cam the same outwardly, thereby unlatching the crosshead 55. This enables the said crosshead to be moved forwardly by the plunger rod 61 when the pin 63 is engaged by the rear end of the slot 62 and is thereby driven by the piston rod 60. Were it not for the fact that the crosshead 55 is latched during the ascent of the elevator 43, the slide bars 48 which rest on the side members 44 of the elevator 43 would be carried forward, as well as upwardly, by the elevator.

Up to this point it has merely been stated, without explanation, that the elevator 43 is lifted and rotated about its supporting links 46 at the outset of each cycle of operation of the flask-pusher mechanism. It is now in order to point out that actuation of the elevator is effected by a pair of upstanding dogs 66, 66 which are pivotally connected at 67, 67 to the two arms, respectively, of a U-shaped yoke 68, which is connected to the piston rod 60 and to the crossbar 65. This yoke serves both as a support for the dogs 66 and as a means for holding the crossbar 65 perpendicularly to the piston rod 60. The upper ends of the two dogs engage the elevator crossbar 45 and, as they are moved forwardly with the piston rod 60, they push the elevator in a direction which is effective to cause it to rotate upwardly about its supporting links 46. This occurs while the crosshead 55 remains latched. When the elevator has reached its uppermost position, wherein the links 46 are over center vertically, it is held against further movement by suitable stops; and thereupon the dogs 66 are cammed downwardly by the crossbar 45, due to the additional pressure resulting from the positive stoppage of the elevator, and are, consequently, disengaged from said crossbar 45 so that they are free to move forward with the piston rod 60. The entire stroke of said piston rod comprises the initial movement necessary to raise the elevator plus the additional movement required to transfer the flasks from one position to the next.

The above-described upward movement of the elevator 43 effects rotation of the cross-shaft 40 by virtue of the links 42 and lever arms 41, and thus causes rotation of the shafts 35, 35 which carry the flask-lifting fingers 36. Hence, the bottom flask is relieved of the weight of the overlying flasks before the commencement of its movement toward position B.

When one of the above-described flask-pushing operations has been completed, an unfilled flask is, resultantly, in position for filling with sand and, thereafter, to receive the pattern impressions which form the cavities 13; and the flask-pusher mechanism is then ready to be retracted in preparation for the next flask-advancing step. This retraction is accomplished by admitting fluid pressure to the cylinder 33, at the end opposite to that at which it was previously admitted, while at the same time releasing the previously applied oppositely directed pressure.

Upon approaching the end of each forward stroke, the crosshead 55 encounters two additional latch hooks 70, 70, which are pivoted to the bar 56 at 71 and provided with springs 72 which bias their free ends towards said crosshead. The free end portion of each said latch hook 70 is notched, as at 73, to receive one of the ears 55a at either end of the crosshead 55, being thus effective to restrain said crosshead against further movement in either direction. It will be apparent that with the crosshead 55 so latched the slide bars 48 cannot be moved lengthwise but are free to move downwardly when permitted to do so by the subsequent descent of the elevator 43.

The first incident in the retraction of the flask-pusher mechanism consists in lowering the elevator 43, which, of course, is accompanied by a lowering of the slide bars 48 with their lugs 50—52, which latter must descend vertically so as not to retract the flasks on the main track and thus displace the one which is in position for filling. The provision for lowering the elevator comprises two Z-shaped brackets 74, 74, each attached to one of the elevator side members 44 and extending horizontally therefrom, as shown most clearly in Fig. 14. To each bracket 74 is attached a spring wire latch 75, located in the path of a latch bar 76 which is anchored to the crossbar 65 and movable therewith. As the crossbar 65 moves forwardly its position is immediately behind the crosshead 55, and the latch bar 76, moving with said crossbar, rides over the top of the latch 75 and depresses the same, until, at length, it passes beyond the free end of said latch and allows the latter to spring up. Now it will be apparent that when the crossbar 65 and latch bar 76 are retracted, the latter will engage the end of the latch 75 and push the same in the direction to cause the elevator 43 to be restored to its down position. The slide bars 48 having thus been lowered, are then ready to be retracted lengthwise to their starting position. But it will be remembered that the crosshead 55 is anchored by the latch hooks 70 and cannot be moved unless and until it is first unlatched; and that is accomplished by the crossbar 65 in the following manner. At the completion of each forward stroke the two ends of the crossbar 65 are seated in complementary recesses or depressions 78 formed in the latch hooks 70; these recesses enable the latch hooks to latchingly engage the ends of the crosshead 55. But immediately to the rear of each recess 78 is a protuberant cam surface 79 which is engaged by the contiguous end of the crossbar 65, as the latter moves rearwardly, thus causing the latch hooks 70 to be forced outwardly to a sufficient extent to disengage the crosshead 55. Before the crossbar 65 has moved rearwardly far enough to allow the latch hooks 70 to return to their normal positions, the crosshead 55 is sufficiently displaced toward the rear so that the ears 55a are out of the paths of the notches 73, and thus all parts driven by the piston rod 60 are free to return to their starting points.

The dogs 66 may conveniently be made of folded sheet metal, as shown in Fig. 14, thus affording, in each instance, between the two sides of the dog a space 66a through which may be passed the end of an upstanding pin 80 which serves as a stop for limiting the upward movement of the dog. Each said pin is secured to the crossbar 65 and is suitably bent at its upper end to cooperate with its associated dog. Near the end of each retractive stroke of the piston rod 60 the two dogs 66 engage the crossbars 45 and are cammed down thereby and thus conditioned to pass to the rear of said crossbar, to the position depicted in Fig. 14.

*The mechanism for filling the flasks with molding sand and applying the facing sand*

In the schematic view, Fig. 16, a flask 10 is shown at the filling station, position B, resting on the main track between the two hoppers 21 and 22. Disposed below said flask and normally at a lower elevation than the tracks (see Figs. 3, 6, 10, 12 and 16) is a rectangular bottom plate 85 which is adapted to be lifted into contact with the bottom of the flask to form lower closures for the mold cavities 12, so that loose sand can be retained therein. The mechanism for lifting the bottom plate 85 into contact with the bottom of the flask comprises a piston reciprocable within a pressure cylinder 86 and connected to a piston rod 87, which in turn is connected to a crosspiece 88 interconnecting the lower ends of the two vertical arms of a pair of identical bellcranks 89, 89, which are fulcrumed on a shaft 90 journaled in a pair of bearing blocks 91, 91, supported on a platform 92, which latter also serves as a mounting for various other parts of the machine. As best depicted in Figs. 3, 10 and 12, the bottom plate 85 is fixedly mounted on a vertical tubular post 93, which is slidably telescoped within the bore of a cylindrical tube 94 here shown as suspended from the platform 92. The tube 94 serves only as a guide for the post 93, and thus as a means for maintaining the bottom plate 85 in horizontal alignment, so that it will bear evenly against the bottom of the flask while the latter continues to be supported on the main track. As will be evident, when fluid pressure is applied to the lefthand end of the cylinder 86, as viewed in Figs. 3, 10 and 12, the bellcranks 89 will be rotated by the piston rod 87 in the direction to elevate the bottom plate 85, together with the tubular post 93. But the movement of the bellcranks is designedly so limited that the bottom plate 85 will rise only to the extent above indicated.

The half-patterns which are to form the semi-cavities 13b (see Fig. 5) in the bottom of the sand fillings are secured to the top surface of the bottom plate 85. Before the flask compartments 12 are filled with molding sand it usually is desirable to coat the top surface of the bottom plate 85 and the half-patterns thereon with facing sand or equivalent powder so that they will not adhere to the molding sand. This is accomplished by means of a sifter 95 comprising a rectangular receptacle having a screen wire bottom, as clearly shown in Fig. 16. The sifter 95 normally is located within the bottom portion of the hopper 21 which holds the facing sand, and is situated underneath a valve plate 96 (see Fig. 6) forming a false bottom for said hopper. The sifter is connected to one end of a pusher rod 97 whose other end is attached, through a fitting 98, to the outer end of a piston rod 100 which, in turn, extends into the bore of a pressure cylinder 101 and is equipped therein with a piston (not shown). Admission of fluid pressure to one end of the cylinder 101 will, obviously, cause the sifter 95 to be ejected from the hopper 21; conversely, admission of fluid pressure to the other end of the cylinder 101 will cause the sifter 95 to be retracted.

The valve plate 96 extends through a slot in the hopper wall and is withdrawable therethrough to permit a charge of facing sand to fall into the sifter, and to that end it is attached to a connecting rod 102 which, in turn, is connected to one end of a piston rod 103 (Fig. 6) having a piston (not shown) reciprocable in a pressure cylinder 104. The piston in this cylinder is actuable by fluid pressure in both directions, and accordingly is operative to move the valve plate 96 in both directions.

To make an application of facing sand, the cylinder 104 is energized to retract the valve plate 96, thereby charging the sifter; and immediately thereafter said valve plate is returned to its shut-off position by energizing the cylinder 104 in the opposite manner. Thereupon, the cylinder 101 is energized to eject the sifter from the hopper to a position overlying the flask. Then, if need be, an electrical vibrator is energized, in order to shake the sifter, or the whole machine, whereby to agitate the facing sand and thus cause it to sift through the screen onto the bottom plate 85 and the half-patterns thereon. When the flask has thereafter been filled with molding sand, it usually is necessary to apply a coating of facing sand to the top surface of the molding sand, and that is accomplished in the manner previously described.

Following the first application of facing sand, the flask is filled with molding sand from the hopper 22; and that is accomplished by means similar to that employed for applying the facing sand. A sand conveyor 106 in the form of a rectangular, bottomless, open-top receptacle, having partitions 107 dividing it into three sand-receiving chambers 108, is normally disposed within the lower portion of the hopper 22 underneath a valve plate 110 which functions as a false bottom for the hopper. This valve plate 110 extends through a slot in one wall of the hopper and is retractable therethrough by means of a pressure cylinder 111 having a piston rod 112 the outer end of which is connected to said valve plate through the medium of a connecting rod 113. It will be apparent that the valve plate 110 is withdrawable from the hopper and returnable to its normal position through energization of the cylinder 111; and it will further be apparent that when said valve plate is retracted the chambers 108 of the conveyor are filled with molding sand from the hopper.

The sand conveyor 106 is attached to the end of one leg of a U-shaped member 115 connected through a return bend to a piston in a pressure cylinder 116, shown in Fig. 2. The cylinder 116 is single-acting, which is to say that it is effective only to retract the sand conveyor 106 back into the hopper 22. Outward movement of the sand conveyor to deliver the sand to the waiting flask is effected by a double-acting pressure cylinder 117, as presently will be made clear.

Situated immediately below and forming a bottom closure for the sand conveyor 106 is a side plate 118. This covers the bottom of the hopper 22 and extends outwardly therefrom (see Fig. 6) through a slot in the housing wall, and is connected through a fitting 119 to the distal end of a piston rod 120 (Fig. 2) having a piston (not shown) disposed in the pressure cylinder 117. This pressure cylinder is located directly under the hopper 22 in vertical alignment with the cylinder 111. It is not shown in the plan view (Fig. 2) and should not be confused with the cylinders 111 and 116. Also connected to the distal end of the connecting rod 120 is a vertically extending arm 121 (see Fig. 6) adapted to bear against the bridge portion 115a of the U-shaped member 115 one leg of which constitutes the piston rod operating in the cylinder 116.

It should be apparent now that when the piston in the cylinder 117 is actuated so as to move its piston rod 120 to the left, as viewed in Fig. 6, the slide plate 118 will be moved in the same direction, so that it overlies the flask 10 at position B. And it will further be evident that the pressure exerted by the arm 121 against the U-shaped member 115 will effect a simultaneous outward movement of the sand conveyor 106, so that the latter is positioned directly over said flask, as most clearly depicted in Fig. 17. The sand conveyor retains its load of sand momentarily because of the underlying slide plate 118; but as soon as the sand conveyor is in position properly to discharge its load, the cylinder 117 is energized in the opposite direction, thereby causing the slide plate to be retracted to the position in which it is shown in Fig. 6. Thus, the load of sand in the conveyor is dumped into the aforementioned flask, whereupon said conveyor is retracted into the hopper by the cylinder 116.

Directly above the flask 10 at position B there is situated a rectangular metal plate 125 having a large rectangular opening in registration with the interior of the flask and through which the molding sand passes upon descending from the sand conveyor into the flask. This plate 125 is comparable in appearance to a flat picture frame comprising four interconnected rectilinear sides. One of the sides, identified by reference numeral 125a, is a rectangular bar of much greater thickness than the other three sides and is disposed in contraposition to the sand conveyor 106, being thus operative as an abutment for limiting the travel of the sand conveyor. The two sides of the plate 125 which extend parallel to the direction of travel of the sand conveyor are provided with upstanding flanges 125b (not shown in the schematic views, Figs. 15–20) spaced apart sufficiently to receive the sand conveyor between them (see Figs. 3, 10 and 12). The function of the plate 125 is that of a spacer, and its purpose is to provide for deposition and retention of enough molding sand in the flask so that when the loose sand is compressed it will tightly fill the flask flush with the top and bottom edges thereof. It will be observed that the sand conveyor rides on the upper surface of the spacer plate 125 which is positioned above the top of the flask a distance that is equal to the thickness of the plate. When the sand conveyor is retracted, after dumping its load, it scrapes all the surplus sand back into the hopper; that is to say, it retracts all the molding sand above the top surface of the spacer plate 125. But that leaves a quantity of sand within the large rectangular opening of said plate standing above the top level of the flask, and it is that quantity, plus the amount displaced by the top half-patterns in forming the semi-cavities 13a, which supplements the bulk of loose sand within the flask to such an extent that the compacted sand fills the flask tightly enough so that it will stay in place without subjacent support.

The spacer plate 125 is supported on a strap iron yoke 126 (Fig. 6) which includes a bridge member 127 interconnecting two depending legs 128, 128, the lower extremities of which are connected respectively to horizontal arms 129, 129, which, in turn, are connected to or integral with two upwardly extending outer arms 130, 130 the upper ends of which are attached to the said spacer plate. The aforementioned bridge member 127 extends across and is secured to a flange 131 forming the upper terminus of a vertical piston rod 132 which extends downwardly into the bore of a pressure cylinder 133 where it is connected to a piston (not shown).

The cavity-forming operation

When the flask at position B has been filled with molding sand and a coating of facing sand has been sprinkled on the top surface of the molding sand, in the manner previously described, the sand filling is ready to receive the pattern impressions which constitute the mold cavities. As previously stated, the half-pattern or patterns which form the semi-cavities 13b (Fig. 5) in the under side of the sand fillings are secured to the top surface of the bottom plate 85; and since these project up into the flask at the outset, the under side impressions are, perforce, formed loosely when the molding sand is dumped into the flask. The complementary half-pattern or patterns, as the case may be, are secured to the under surface of a platen 135 in the form of a rectangular metal plate, suspended from and firmly secured to a pair of supporting bars 136, 136 which may be secured at their ends to the two hoppers 21 and 22, respectively.

For the purpose of pressing the upper half-patterns into the sand filling, fluid pressure is admitted to the cylinder 133, thereby causing the piston rod 132 to rise and engage the bottom surface of the bottom plate 85 and then move said bottom plate upwardly, together with the flask and its sand filling. The upward movement of the piston rod 132 is sufficient to elevate the upper surface of the flask to the level of the under surface of the platen 135, thus causing the sand filling to be pressed down flush with the top of the flask, while at the same time being kept flush with the bottom of the flask by the bottom plate 85. Enough pressure is thus brought to bear against the sand filling to compact it firmly throughout the flask and into intimate contact with all exposed surfaces of the patterns.

As the piston 132 ascends, it carries with it the yoke 126, thereby elevating the spacer plate 125 whose rectangular opening is large enough to admit the platen 135. Upon completion of the pressing operation, fluid pressure in the cylinder 133 is released whereupon the piston 132 descends, and with it the bottom plate 85, the flask 19 and the spacer plate 125. Pressure in the cylinder 86 is then reversed to actuate the bell-cranks 89 in the direction to lower the bottom plate 85 to a level below the bottom of the flask, thus freeing the flask so that it can be moved along the main track without disturbing the sand filling therein.

As depicted in Fig. 19, the filled flask is moved along the main track to position C thereon in response to the succeeding operation of the flask-pusher mechanism which, as before, places a fresh flask at position B in readiness for filling.

Stacking the filled flasks

Assuming the presence of a filled flask on the main track at position C, as per Fig. 19, the next succeeding operation of the flask-pusher mechanism will result in transference of said flask onto the auxiliary track comprising the auxiliary rails 26, 26. These latter are identical U-shaped bars, as shown most clearly in the schematic views, Figs. 15–20, having downwardly sloping parallel arms which are pivotally connected at their lower ends to the brackets 124 secured to the frame structure. Normally, the horizontal portions of the two auxiliary rails are so spaced as to underlie the flask and provide supports therefor, as exemplified in Fig. 20.

The previously-mentioned elevator platform 28 is disposed centrally of and below the two auxiliary rails 26, 26; and when in its lowermost position, as shown in Fig. 3, it is at a sufficiently low level, relatively to the auxiliary rails, so that a stack 137 (see Fig. 1) comprising several filled flasks resting on this platform may be contained in the intervening space. The platform 28 is secured to the upper end of a plunger or piston rod 138 which extends downwardly into the bore of a pressure cylinder 139. This platform can, therefore, be elevated by admitting fluid pressure to said cylinder and, conversely, lowered by releasing the pressure therefrom.

As soon as a filled flask has been transferred to the auxiliary track, the elevator platform 28 is moved upwardly, together with whatever flask may already be positioned thereon; the platform, or the uppermost flask thereon, then engages the sloping arms of the two auxiliary rails 26, 26 and spreads said rails apart so that the flask resting thereon drops down, either onto the platform or onto the top one of the stack of flasks previously deposited thereon.

In most cases it is desirable to include a rectangular board or metal plate 123 at the bottom of each stack of flasks 137 to give support to the sand fillings therein, and to that end means are provided, as a part of the machine, for placing such board or plate on the platform 28 prior to the initiation of each stack. Such a means comprises a carriage 143 (see Figs. 15–17 and 20) in the form of an elongate rectangular metal frame comprising two parallel, laterally spaced side bars 144, 144, interconnected at one end by a tie-bar 145 which is connected centrally to a piston rod 146 having a piston (not shown) reciprocable in a pressure cylinder 147, the said carriage 143 being reciprocable lengthwise by said cylinder, piston and piston rod.

The carriage 143 is located at an elevation just above the top of the platform 28 when the latter is at its lowermost level, wherefore it is capable of sliding over the top of the platform; and it is aligned with the space between two parallel cleats 142, 142 attached to the top of the platform and projecting upwardly therefrom to the same level as the tops of the side bars 144, or slightly lower. The two side bars 144 are spaced to pass between the cleats 142.

A bar 150 extending transversely of the side bars and overlying the same is welded or otherwise secured thereto and functions as an abutment to ensure that when a board 123 has been placed on the carriage 143 it will move positively with said carriage to its destination atop the cleats 142 on the platform 28.

A board 123 is shown in each of the schematic views, Figs. 15–20 inclusive. In each of Figs. 15–17 said board is shown positioned at one side of the carriage 143, in readiness to be moved onto the carriage at a position immediately ahead of the bar 150. In Fig. 12 it is shown on the carriage. In Fig. 13 it is shown still in the carriage, but shifted by the carriage to a position overlying the elevator platform 28.

A dog 151 secured to and projecting upwardly from the front of the two side bars 144 serves to engage the adjacent bottom edge of the stack 137 when the carriage 143 is moved forwardly, and is thus effective to push each completed stack 137 off the elevator platform 28 onto any suitable table, truck, or conveyor. In order to enable the carriage 143 to be withdrawn without retracting the newly placed board 123 from the platform 28, the dog 151 is yieldably spring-biased and hinged so that it will assume a horizontal posture when brought to bear against the edge of the board 123 at the outset of each retractive movement of said carriage. This is amply illustrated in Fig. 19 wherein the carriage 143 may be assumed to have just started a retractive movement, and wherein the dog 151 is in horizontal posture as a result of its contact with the adjacent board 123. Manifestly, the carriage 143 must be retracted before the elevator is raised; and it is not operated again, after retraction, until a new stack 137 is to be started.

A supply of boards 123 is stacked in a suitable hopper 155 (see Figs. 2 and 8) which is open at the top to receive the boards and provided with opposed inwardly projecting shelves 156 on which the stack of boards rests. A horizontal slot 157 is provided in the wall of the hopper 155 adjacent the carriage 143, and is wide enough vertically and long enough horizontally to pass one board only. A spring-pressed dog 158 is attached to the distal end of a piston rod 159 having a piston (not shown) reciprocable in a pressure cylinder 160. This dog is biased upwardly to engage the back edge of the lowermost board in the hopper, and is thus operative by the piston rod 159 to transfer said lowermost board to the carriage, as previously described.

The cylinders 147 and 160 are supported by a platform 161 forming an integral part of the machine frame, and the carriage 143 is slidably mounted on the top surface of said platform.

*The vertically adjustable sand hopper*

It is preferable so to construct the present molding machine that it can be made to accommodate flasks of different depths, conformably to the dimensions of the castings to be made. By so doing, the quantity of molding sand required will be limited to an approximate minimum with a corresponding increase in the number of flasks in each stack when the height of the castings permits of the use of shallow flasks. And it may further be desirable to provide for the use of sand conveyors 106 of various depths, each selected one being proportioned to hold a quantity of molding sand equal to what is needed to fill the flask in each specific case—neither less nor substantially more. Consequently, I prefer to construct the molding sand hopper 22 in the manner illustrated in Fig. 7. Therein the bottom plate 23 is adjustably movable vertically between two vertical side plates 18, 18 independently of the main part of the hopper, and the latter also is bodily movable vertically relatively to the bottom plate 23. The main part of the hopper is drilled and tapped to receive capscrews 19 which extend through vertical slots 16 and serve to secure the hopper at any elevation to which it may be adjusted, within the limits determined by the slots 16. The height of the opening 25, which is designed to receive the sand conveyor 106 and the valve plate 110, as shown in Fig. 6, may thus be varied to suit sand conveyors of various depths; and the elevation of the bottom plate 23 may at the same time be regulated so that the slide plate 118 is at a level immediately above the spacer plate 125 and thus capable of clearing the same.

The facing sand hopper 21 should, obviously, be mounted in a similar manner so that the sifter 95 will be at a proper level.

*The controls and sequence of operations*

The present machine is controlled manually by means of three rotary valves 163, 166 and 169, mounted in any convenient position, as shown for example in Fig. 1. The valve 163 is provided with an operating handle 164 and an indicator 165; the valve 166 with an operating handle 167 and an indicator 168; and the valve 169 with an operating handle 170 and an indicator 171. In the schematic diagram (Fig. 9) there are shown the various tubing connections between the three valves 163, 166 and 169 and their respectively associated pressure cylinders.

The valve 163 includes a rotor 172 disposed in the bore of a valve body 173 having seventeen radial ports 174 communicating with the rotor, and connected exteriorly to the individual tubes extending to the various cylinders with which the valve 163 is associated. These comprise the cylinders 33, 101, 104, 111, 116, 117, 133 and 139. The rotor 172 has a radial passageway 175 which registers sequentially with ports 174 and is connected via the axial bore of the rotor with an intake pipe 177 through which compressed air is supplied. A second radial passageway 176 in the rotor 172 is likewise adapted to register sequentially with the ports 174 and connects with the ambient atmosphere. The passageway 176 is angularly displaced from the passageway 175 so that it comes into registration with each successive port 174 immediately after the passageway 176 has passed therebeyond. Hence, it will be clear that the passageway 176 serves to relieve the pressure from the several associated cylinders following each energization thereof. The same arrangement obtains in the valve 166, except in that instance there are only four valve body ports 178. The valve 166 serves the two cylinders 147 and 160.

The valve 169 is a four-way valve serving only the cylinder 86. It comprises a valve body 180 and a rotor 181. The valve body has an intake port 182, two discharge ports 183, 184 connected respectively to the two ends of the cylinder 86, and an exhaust port 185. The intake port 182 is connected, as shown, to a branch 177a of the compressed air supply pipe 177, this branch extending also to the valve 166. The rotor 181 has a passageway 186 which is operative in one position of the rotor to connect the intake port 182 with the discharge port 183 and, alternately, to connect the intake port 182 with the discharge port 184, being thus effective to direct compressed air to either end of the cylinder 86, selectively. A second rotor passageway 187 is operative, in one position, to connect the exhaust port 185 with the discharge port 183 and, alternately, to connect said exhaust port with the discharge port 184. It will be apparent that when the rotor 181 is positioned to admit compressed air to one end of the cylinder 86, it is at the same time positioned to relieve the air pressure in the other end of said cylinder.

The rotor 172 of the valve 163 is shown in position to admit air to the rear end of the cylinder 33 which is the first step in the cycle of operation of the machine. This results in advancement of the flask-pusher mechanism, thus transferring an empty flask from the bottom of the stack at position A to the filling station at position B, while at the same time advancing two filled flasks one of which moves onto the auxiliary rails 26, 26.

Rotation of the rotor 172 in the direction indicated, to the next succeeding position, admits compressed air to the other end of the cylinder 33, thus retracting the flask-pusher mechanism. But meanwhile the passageway 176 has moved into registration with and passed beyond the first port 174, and has thereby relieved the pressure in the rear end of the cylinder 33.

Immediately following the retractive energization of the cylinder 33, and before moving the rotor 172 to the third position, the four-way valve 169 is operated manually to rotate the bellcranks 89 in the direction to lift the bottom plate 85 into contact with the bottom of the flask therebove, and said four-way valve is left in that position until after the cylinder 133 has subsequently been energized. In the third position of the valve rotor 172, air is admitted to one end of the cylinder 104, thereby withdrawing the valve plate 96 and thus allowing a charge of facing sand to gravitate into the sifter 95. In the fourth position, air is admitted to the other end of the cylinder 104, thereby restoring the valve plate 96 to its normal position, as depicted in Fig. 6. In the fifth and sixth positions, air is admitted successively to alternate ends of the cylinder 101, thereby causing the sifter 95 to move out over the flask and then to be retracted. While the sifter is positioned over the flask, it (or the whole machine) is vibrated, either by means of an electrical or mechanical vibrator or manually, so that a small amount of facing sand is sprinkled onto the bottom plate 85 and the half-patterns thereon.

In the seventh and eighth positions of the rotor 172, air is admitted successively to the two ends of the cylinder 111, thereby effecting withdrawal and retraction of the valve plate 110 which results in filling the sand conveyor 106. When the valve rotor 172 is moved to the ninth position, air is admitted to one end of the cylinder 117, thereby causing the slide plate 118 to move out over the flask at position B, and with it the sand conveyor 106. In the tenth position of the rotor 172, air is admitted to the other end of the cylinder 117, thereby retracting the slide plate 118, but not the sand conveyor 106. Thus, the molding sand is discharged into the flask. In the eleventh position, air is admitted to the cylinder 116, thereby retracting the sand conveyor.

The twelfth to fifteenth positions, inclusive, of the rotor 172 are, in effect, repetitions of the third to the sixth positions, respectively, and have like effects in that they bring about operation of the sifter 95 and valve plate 96, thereby depositing a small quantity of facing sand atop the molding sand in the flask.

In the sixteenth position of the rotor 172, air is admitted to the cylinder 133, causing the bottom plate 85 to rise and move the filled flask upwardly against the platen 135, thus compacting the sand in the flask. Thereupon, the four-way valve 169 is again operated to rotate the bellcranks 89 in the direction which allows the bottom plate 85 to descend to its normal down position which it will do when pressure in the cylinder 133 is subsequently relieved. In the seventeenth position of the rotor 172, air is admitted to the cylinder 139, thereby elevating the platform 28 to remove a filled flask from the auxiliary tracks. The final step in the cycle of operation of the valve 163 results in releasing the pressure in the cylinder 139 and again energizing the cylinder 33, which latter is the first step in the succeeding cycle.

The valve 166 is manipulated only when there is occasion to position a board 123 on the elevator platform 28. Each such occasion is, of course, an incidental preliminary to the inception of a successive stack of filled flasks. This valve 166 includes a body casting 189 provided with four radial ports 178 and a rotor 190 having a radial intake passageway 191 communicating with the bore thereof and adapted to register, consecutively, with ports 178 whereby to admit compressed air to each of these ports in succession. In addition, the rotor 190 has an exhaust passageway 192 arranged to register consecutively with the ports 178 for the purpose of releasing pressure from the several cylinder chambers in the proper order. One revolution of the operating handle 167 brings about a complete cycle of operation of the two cylinders 147 and 160, and thereby effects transfer of a board 123 from the bottom of the stack in the hopper 155 to the top of the elevator platform 28.

While I have described what I presently regard as the preferred embodiment of my invention, it will be evident that there are many possible alternatives and modifications within the scope and purview of my broad inventive concept and, accordingly, the invention should not be regarded as limited otherwise than as indicated by the terms of the appended claims.

I claim:

1. A molding machine comprising a horizontal track, a filling station adjacent said track, mechanism operative to advance flasks along said track intermittently in measured steps, each of which steps is of proper length to position an unfilled flask at said filling station, means at said filling station for depositing molding sand in the flask momentarily situated thereat, and means at said filling station including an upper stationary platen and a vertically movable bottom plate for compacting the sand in said flask and for impressing semi-cavities into the top and bottom surfaces of the sand filling and thereby forming cope and drag sections of a mold in the same flask.

2. The combination in a molding machine of a track comprising a pair of laterally spaced rails, a filling station adjacent said track, mechanism operative to advance along said track, in steps of predetermined length, a series of flasks, each of which is open at both top and bottom, each cycle of operation of said mechanism being effective to position an empty flask at said filling station, a bottom plate normally located below said track at said filling station, a first means operative to lift said bottom plate into contact with the bottom of a flask at said filling station, a second means operative to further lift said bottom plate and thereby elevate said flask at said filling station, said bottom plate serving as a bottom closure for the flask at said filling station, means at said filling station for depositing a mass of molding sand in the flask thereat, a first half-pattern secured to the top of said bottom plate and projecting upwardly therefrom, a stationary platen located above said track at said filling station and overlying the flask on the track thereat, a second half-pattern carried by and projecting downwardly from said platen, said first and second half-patterns being complementary, said second means being effective to squeeze said mass of molding sand to compact the same within its flask and to impress said first and second half-patterns into said mass.

3. The combination in a molding machine of a main track comprising a pair of laterally spaced parallel rails adapted to support a series of flasks, mechanism operative to propel flasks along said track intermittently, in steps of predetermined length, so that each flask, in turn, is brought to rest at a given filling station, a bottom plate normally positioned below and intermediately of said rails at said filling station, said bottom plate being movable upwardly from its normal position to contact the bottom of a flask resting on said rails at said filling station and thus to form a temporary bottom closure for said flask, fluid-pressure means operative to elevate said bottom plate into contact with the bottom of said flask, a second fluid-pressure means operative to further elevate said bottom plate together with the overlying flask, a stationary platen located above the top level of said flask and disposed in vis-a-vis relation to said bottom plate, said platen and bottom plate being effective, conjointly, to compress sand in said flask when said bottom plate is elevated by said second fluid-pressure means, and means for depositing sand in said flask at said filling station.

4. The combination in a molding machine of a track comprising a pair of laterally spaced rails, a filling station adjacent said track, and flask-pusher mechanism operative to propel a series of flasks along said track intermittently, in steps of predetermined length such that the flasks on said track are brought successively and individually into filling position at said filling station, said mechanism comprising a pair of slide bars extending parallel to said rails and each located adjacent one of said rails individually, said slide bars being positioned at a lower level than their respectively associated rails and each provided with at least one upwardly projecting lug, an elevator supporting said slide bars and movable through an arcuate path to elevate said slide bars to bring said lug or lugs into position to drivingly engage a flask or flasks on said track and further operative to depress said slide bars upon completion of a single forward movement of the flasks along said track, so that said lug or lugs will clear the flasks, guiding means slidably connected with the slide bars for causing the same to move vertically during the arcuate travel of the elevator, and means operative to move said slide bars forwardly lengthwise after the same have been elevated sufficiently to enable said lug or lugs to drivingly engage a flask or flasks, said last-mentioned means being further operative to retract said slide bars when the same have been lowered following completion of each forward step of said mechanism.

5. The combination in a molding machine of a track comprising a pair of laterally spaced rails, a filling station along said track, and flask-pusher mechanism operative to propel a series of flasks along said track in repetitive steps of predetermined length such that the flasks on said track are brought successively and individually into filling position at said filling station, said mechanism comprising a pair of elongate slide bars extending parallel to said rails and each located adjacent one of said rails individually, said slide bars being positioned at a lower level than their respectively associated rails and each provided with a plurality of upwardly projecting lugs, said lugs being so spaced apart lengthwise of their slide bars that each is adapted to drivingly engage the rear edge of a flask, and an elevator supporting said slide bars and movable through an arcuate path to elevate said slide bars vertically simultaneously, together with said lugs, a guide slidably connected with the slide bars for causing the same to move vertically during the arcuate travel of the elevator, latching means for holding the guide against forward movement, and means operating to unlatch the guide and to move said slide bars lengthwise to advance said flasks along said track, said means being further operative to depress said slide bars at the end of each forward step and then to retract said slide bars to their starting position.

6. The combination according to claim 5 including an elevator comprising a pair of elongate side members individual to and located beneath their respectively associated slide bars and forming supports along which said slide bars are slidable lengthwise of said track, pivoted links supporting said side members and maintaining the same parallel to their associated rails while enabling them to ascend and descend along an arcuate path, thereby elevating and lowering said slide bars, and fluid-pressure operated reciprocatory means operative upon movement in one direction to lift said elevator together with said slide bars and thereafter to move said slide bars lengthwise and forwardly of said track, said means being further operative upon movement in the opposite direction to lower said elevator together with said slide bars and thereafter to retract said slide bars lengthwise to their starting position.

7. The combination according to claim 5 including a crossbar interconnecting said slide bars at one end, a crosshead located below said crossbar, a vertical member secured to said crosshead and slidably engaging said crossbar and effective to keep said crosshead and crossbar in vertical alignment, a pair of latch hooks normally engaging said crosshead and effective to prevent movement thereof lengthwise of said track, a plunger rod connected to said crosshead and projecting laterally therefrom lengthwise of said track, a piston rod telescopically connected to said plunger rod, a second crossbar actuable by said piston rod and extending transversely thereof, said second crossbar being effective to unlatch said crosshead following an initial forward movement of said piston rod, and a dog movable with said piston rod and normally engaging said elevator, said dog being effective during each initial forward movement of said piston rod to raise said elevator, said second crossbar being effective to unlatch said crosshead only after said elevator has been fully raised.

8. The combination according to claim 5 including an elevator comprising a pair of elongate side members individual to and located beneath their respectively associated slide bars and forming supports along which said slide bars are slidable lengthwise of said track, pivoted links supporting said side members and maintaining the same parallel to their associated rails while enabling them to ascend and descend along an arcuate path, thereby elevating and lowering said slide bars, fluid-pressure operated reciprocatory means operative upon movement in one direction to lift said elevator together with said slide bars and thereafter to move said slide bars lengthwise and forwardly of said track, said means being further operative upon movement in the opposite direction to lower said elevator together with said slide bars and thereafter to retract said slide bars lengthwise to their starting position, a crossbar interconnecting said slide bars at one end, a crosshead located below said crossbar, a vertical member secured to said crosshead and slidably engaging said crossbar and effective to keep said crosshead and crossbar in vertical alignment, a pair of latch hooks normally engaging said crosshead and effective to prevent movement thereof lengthwise of said track, a plunger rod connected to said crosshead and projecting laterally therefrom lengthwise of said track, a piston rod telescopically connected to said plunger rod, a second crossbar actuatable by said piston rod and extending transversely thereof, said second crossbar being effective to unlatch said crosshead following an initial forward movement of said piston rod, a dog movable with said piston rod and normally engaging said elevator, said dog being effective during each initial forward movement of said piston rod to raise said elevator, said second crossbar being effective to unlatch said crosshead only after said elevator has been fully raised, and additional latching means operative to latch said crosshead in its forward position whereby to cause said slide bars to descend vertically along a rectilinear path while said elevator is descending arcuately, said second crossbar being effective during the initial portion of each retractive stroke of said piston rod to deactuate said additional latching means and thereby release said crosshead for retraction.

9. The combination in a molding machine of a horizontal track adapted at one end to support a stack of flasks, flask-pusher mechanism operative to engage the bottom flask of the stack and propel the same along said track, and mechanism operative to lift all the flasks of said stack except the bottom flask, whereby to release said bottom flask for free movement along said track, said flask-lifting mechanism comprising a pair of horizontal shafts located at either side of said stack in a fixed position with relation to the horizontal track, each of said shafts having a pair of laterally projecting fingers operative, upon rotation of said shaft, to engage the flask immediately above said bottom flask in a manner effective to lift the same together with the flasks thereabove, and means connected with and actuated by the flask-pusher mechanism for rotating said shafts conjointly.

10. The combination in a molding machine of a horizontal track adapted at one end to support a stack of flasks, flask-pusher mechanism operative to engage the bottom flask of the stack and propel the same along the track, mechanism operative to lift the flasks of the stack except the bottom flask, whereby to release said bottom flask for free movement along said track, said flask-lifting mechanism comprising a pair of shafts located at either side of said stack, each of said shafts having a pair of laterally projecting fingers operative, upon rotation of said shaft, to engage the flask immediately above the bottom flask in a manner effective to lift the same together with the flasks thereabove, means for rotating said shafts conjointly including a cross shaft drivingly interconnected with each of the previously mentioned shafts, a lever connected to and projecting laterally from said cross-shaft, said flask-pusher mechanism comprising an elevator and a pair of slide bars resting on the elevator and slidably movable lengthwise thereon horizontally, said slide bars having means for drivingly engaging the flasks on said track, a link interconnecting said elevator with said lever whereby to rotate said shafts in response to vertical movement of the elevator, and fluid-pressure operated means for actuating said elevator and slide bars.

11. The combination in a molding machine including a horizontal track, a filling station adjacent said track, a series of flasks, mechanism operative to advance along said track, in steps of predetermined length, each flask of said series of flasks for successively positioning the same at said filling station, said flasks being open at both top and bottom, a vertically movable bottom plate underlying the flask at the filling station and forming a temporary bottom closure therefor, a half-pattern positioned on the top surface of said bottom plate and projecting upwardly therefrom into said flask, a stationary platen located above said flask and having a bottom surface parallel to the top surface of said flask, a second half-pattern secured to the bottom surface of said platen and projecting downwardly therefrom, and means operative to effect vertical movement of said bottom plate toward and away from said stationary platen, said bottom plate and platen being effective, conjointly, to squeeze a mass of molding sand contained within said flask to compact the same and to form semi-cavities in the mass of sand conforming to said half-patterns and thereby forming cope and drag sections of a mold in the same flask.

12. The combination according to claim 11 wherein said platen is stationary and wherein said means is operative to lift said bottom plate, together with said flask, to effect the specified squeezing and cavity-forming operation.

13. The combination according to claim 11 including a hopper adapted to contain a supply of molding sand, and a reciprocable conveyor operative to withdraw molding sand from said hopper and to deposit the same in said flask.

PAUL KVEDERIS.

REFERENCES CITED

The following references are of record in the file of this patent:

UNITED STATES PATENTS

| Number | Name | Date |
| --- | --- | --- |
| 768,071 | Packer | Aug. 23, 1904 |
| 854,690 | Dawes | May 21, 1907 |
| 1,008,207 | Simpson | Nov. 7, 1911 |
| 1,126,194 | Graham | Jan. 26, 1915 |
| 1,134,398 | McCarte | Apr. 6, 1915 |
| 1,158,045 | Graham | Oct. 26, 1915 |
| 1,343,335 | Prince | June 15, 1920 |
| 1,535,802 | Bendixen | Apr. 28, 1925 |
| 1,571,642 | Rathbone | Feb. 2, 1926 |
| 1,686,696 | Hirschmann | Oct. 9, 1928 |
| 1,734,177 | McCabe | Nov. 5, 1929 |
| 1,741,116 | Ramsden | Dec. 24, 1929 |
| 1,752,175 | Harmes | Mar. 25, 1930 |
| 1,773,732 | Hines | Aug. 26, 1930 |
| 1,781,451 | Eckstein | Nov. 11, 1930 |
| 2,005,522 | Holm | June 18, 1935 |
| 2,050,711 | Malocsay | Aug. 11, 1936 |